United States Patent [19]

Cagan et al.

[11] Patent Number: 5,027,522
[45] Date of Patent: Jul. 2, 1991

[54] ELECTRONIC LEVEL INDICATOR

[75] Inventors: Uri Cagan, Kibbutz Amiad; Lev Diamant, Moshav Maof; Geoffrey Goodman, Kibbutz Amiad, all of Israel

[73] Assignee: Amrad Research and Development, Kibbutz Amiad, Israel

[21] Appl. No.: 451,005

[22] Filed: Dec. 15, 1989

[30] Foreign Application Priority Data

Jan. 4, 1988 [IL] Israel ............................................ 88882

[51] Int. Cl.$^5$ .............................................. G01C 9/06
[52] U.S. Cl. ...................................... 33/366; 324/676; 324/710
[58] Field of Search .................. 33/366; 324/673, 676, 324/706, 710

[56] References Cited
U.S. PATENT DOCUMENTS

| | | | |
|---|---|---|---|
| 3,227,951 | 1/1966 | Dykaar | 324/673 |
| 4,167,818 | 9/1979 | Cantarella et al. | 33/366 |
| 4,208,625 | 6/1980 | Piso | 324/673 |
| 4,549,277 | 10/1985 | Brunson et al. | 33/366 |
| 4,858,331 | 8/1989 | Maus | 33/366 |

Primary Examiner—William A. Cuchlinski, Jr.
Assistant Examiner—C. W. Fulton
Attorney, Agent, or Firm—Rogers & Killeen

[57] ABSTRACT

An electronic level indicator, having a housing including at least one planar surface, a gravity responsive sensor mounted on the housing, the sensor constituting at least a part of two branches of an electronic bridge circuit, a pulse generator coupled to the bridge circuit for feeding the bridge circuit with short pulses, a differential amplifier connected to the output of the bridge circuit, an A/D converter connected in circuit for receiving signals from the amplifier and a display unit connected to the output of the converter for displaying numerical data indicative of the inclination of the planar surface.

7 Claims, 2 Drawing Sheets

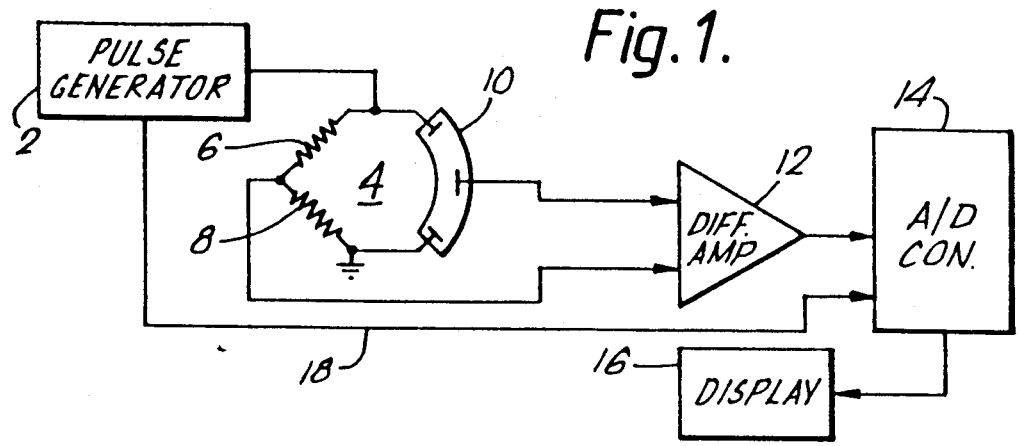
Fig. 1.
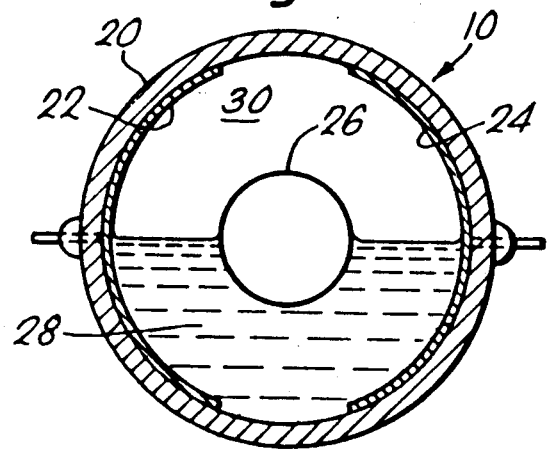
Fig. 2.
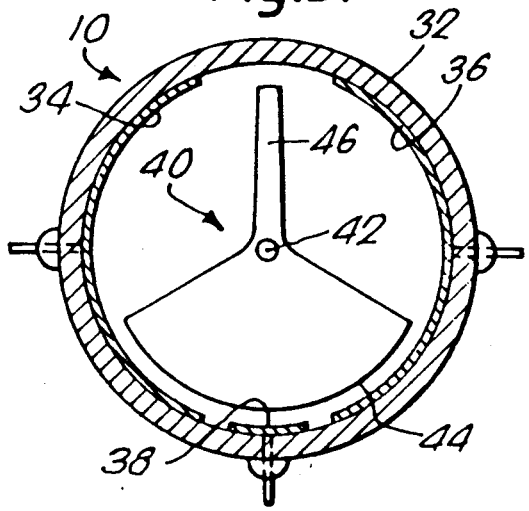
Fig. 3.
Fig. 4.

ELECTRONIC LEVEL INDICATOR

The present invention relates to electronic level indicators and more specifically to leveling indicators displaying numerical and/or analog readouts of deviations from any plane or line.

In general, there are known two basic types of level and angle indicators: the ancient air or gas bubble type level and the gravity influenced and responsive pendulum-type level. These types permit only an imprecise and subjective assessment of zero position or an inexact knowledge of deviation from it. Conventional solutions to the limitations have included, for example, various pendular and optical devices. However, these require more skill or are more prone to damage and are, therefore, more costly. The two basic types of indicators have been developed over the years and adapted to provide electronically, a digital or an analog readout by means of suitable sensors of various kinds. There are available sensors based on an electrolytic fluid in which the air bubble floats, which air bubble constitutes an insulation media between two electrodes, thereby causing changes of electrical resistance. Alternatively, the air bubble can be disposed in an opaque fluid, e.g., mercury, and the movement thereof is detected by means of a photoelectric cell, the current of which is influenced by the movement of the bubble. The second pendulum type level utilizes the principle of capacitive or inductive changes between a metallic pendulum (or moveable body) and a stationary plate or coil.

There are also available battery-powered devices, incorporating one or more possible electro-mechanical, optical, mechanical, control and computing units combined to sense, signal, compute and indicate, even remotely, orientation to gravity or arbitrary reference. Notwithstanding the type of measurement performed, the accuracy can be predetermined and separate controls may disengage the portable power source. e.g., a battery, with time, interchange between units of measurement and reprogramming. Means have also been described for reducing temperature instability and battery drain. However, despite their essential usefulness the devices so far available are affected by one or more problems such as human error or lack of skill, inaccuracy, inadequate range and resistance to everyday common use, particularly by the semi-skilled and craftsman. Above all, a major drawback of the more accurate and reliable electronic levels and/or angle-finders has been their price, particularly the relatively high price of sensors, preventing a truly mass market.

Within this framework of the state of art, it is a broad objective of the present invention to ameliorate the disadvantages of the abovedescribed devices and to provide an electronic level indicator which is durable, easy to operate and of low cost.

These and other objects of the present invention are achieved by providing an electronic level indicator, comprising a housing having at least one planar surface, gravity responsive sensor means mounted on said housing, said sensor means constituting at least a part of two branches of an electronic bridge circuit, a pulse generator coupled to said bridge circuit for feeding said bridge circuit with short pulses, a differential amplifier connected to the output of said bridge circuit, an A/D converter connected in circuit for receiving signals from said amplifier, and a display unit connected to the output of said converter for displaying numerical data indicative of the inclination of said planar surface.

The invention further provides an electronic level indicator. comprising a housing having at least one planar surface, gravity responsive sensor means mounted on said housing, said sensor means constituting at least a part of two branches of an electronic bridge circuit, a microprocessor coupled to said bridge circuit for feeding said circuit with short pulses, a differential amplifier connected to the output of said bridge circuit, a sample and hold circuit connected to receive output signals from said differential amplifier and said microprocessor, a comparator connected to receive a first signal, at its first input terminal from said sample and hold circuit, a second signal at its second input terminal from said microprocessor via a D/A converter, and to provide an output signal to said microprocessor, and a display unit connected to said microprocessor for displaying numerical data indicative of the inclination of said planar surface with respect to a reference level.

The term "electronic level indicator" as used herein is meant to define all types of indications associated with the term "level" which are: indications of angles in degrees, inclinations in percents, slopes etc.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a block diagram of an electronic level indicator according to the present invention;

FIG. 2 is a cross-sectional view of an electrolytic-type sensor for use with the present invention;

FIG. 3 is a cross-sectional view of a capacitive-type sensor for use with the present invention;

FIG. 4 is a block diagram of a preferred embodiment of the invention, and

Figure 5:
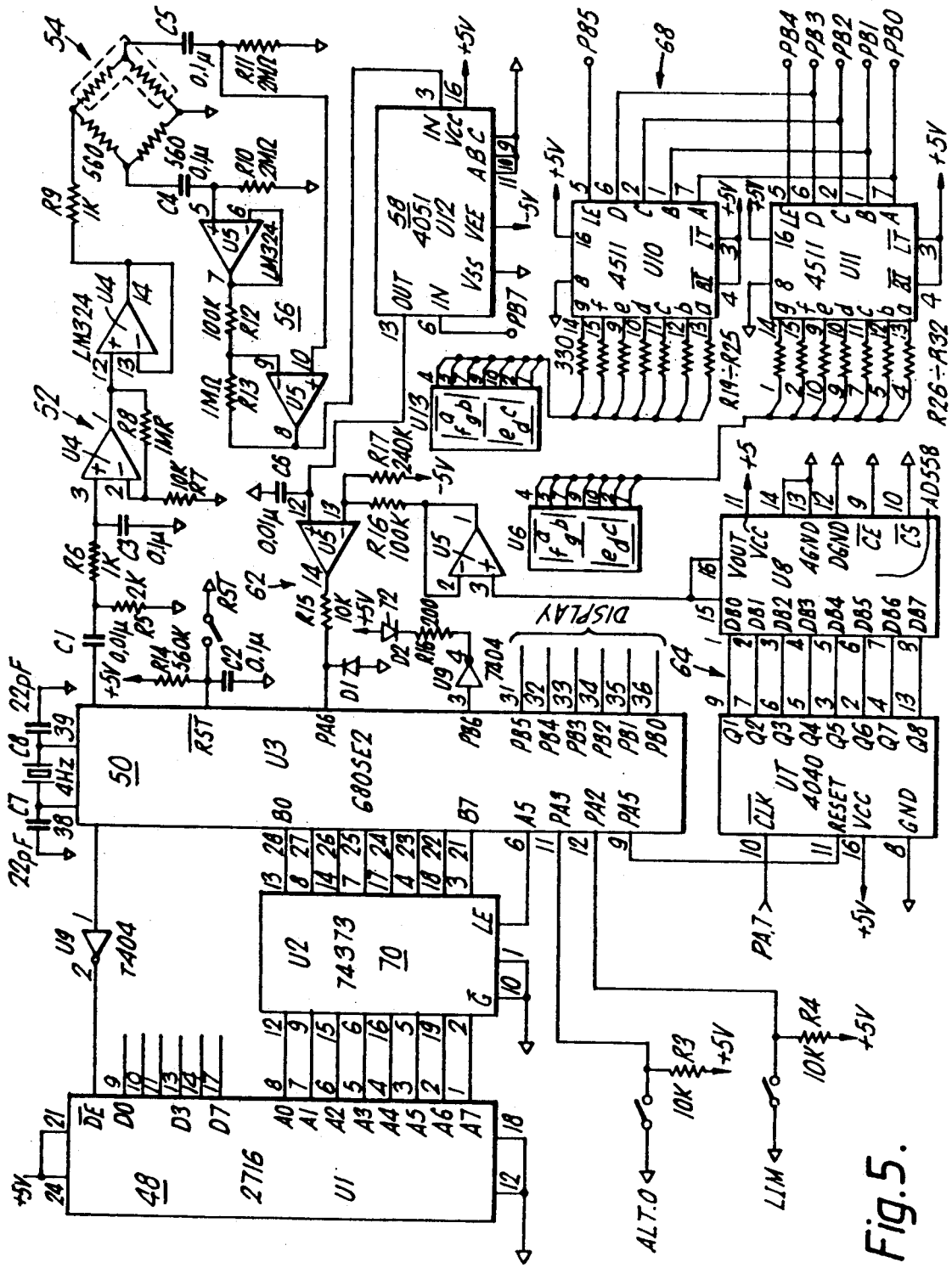
FIG. 5 is a circuit diagram of FIG. 4.

The electronic level indicator shown in FIG. 1 is composed of a pulse generator 2 feeding a bridge circuit 4, which bridge circuit includes two resistive branches 6 and 8 and two branches consisting of a gravity influenced and responsive sensor 10. The output from the bridge circuit 4 is coupled to a differential amplifier 12 which, in turn, is connected to an A/D converter 14. The output of the converter 14 leads to a display driver and unit 16. The converter 14 is also directly connected to the pulse generator 2 via lead 18 for receiving therethrough synchronization and activation signals.

In FIGS. 2 and 3 there are schematically illustrated two, per-se known, types of sensors 10, utilizable in the level indicator of the present invention. The sensor shown in FIG. 2 is an electrolytic type comprising a casing 20, electrodes 22 and 24 extending over a part of the inner surface of the casing, and a third electrode 26 in the center thereof. The remaining space inside the casing is divided between an electrolytic fluid 28 and an air "bubble" 30.

The capacitive, pendulum type sensor is shown in FIG. 3. Inside the casing 32 there are disposed three stationary electrodes 34, 36 and 38. A pendulum 40 is pivotally suspended at 42 inside the casing, which pendulum includes at its lower edge a moveable electrode 44 and its upper portion 46 serves as an oscillation damper.

An inductive pendulum-type sensor with windings in place of electrodes can similarly be utilized.

In order to provide a low cost electronic level for a wider market, ease of replace of the sensor would confer several advantages. Sensor specification could be matched to target price, whilst leaving room for instant exchange for repair, calibration, operational or production purposes.

Therefore, there is envisioned an electronic level in which the sensor is built as a separate capsule, to be separately attached to the main body of the level by means facilitating rapid exchange including interconnection of electrical terminals.

The operation of the level indicator is as follows: the pulse generator 2 is set to emit short symmetric pulses of a duration of e.g., between 50 to 80 microseconds each. The pulses are applied to the bridge circuit 4 which is adjusted so that when the sensor 10 is in its "level state", the differential amplifier 12 emits a "0" signal. Upon receiving a synchronizing pulse from the generator 2, the converter 14 processes the signal applied thereto by the amplifier 12 and activates the display driver and unit 16 accordingly. Thus, the operator obtains a digital readout proportional to the signal produced by the sensor as the result of its positioning in an inclination to a preset level.

In this regard, it should be understood that in practice at least the sensor 10 is disposed within, or connected to a housing or a framework having at least one planar surface constituting a reference surface for measurements.

A more versatile embodiment of the level indicator according to the present invention is illustrated in FIGS. 4 and 5. The level indicator is comprised of a programmable memory 48 operationally coupled to a microprocessor 50. The latter is adapted to emit short pulses which are applied via a pulse conditioner 52 to the bridge circuit 54. The output signals from the bridge are passed to a differential amplifier 56 and on to a Sample and Hold circuit 58. Upon the arrival of a synchronous "sample" signal from the microprocessor 50 via lead 60, the circuit 58 applies a signal to a comparator 62. The comparator 62 is provided with a second input originating at the microprocessor 50 and leading via a D/A converter 64 thereto. The comparator 62 activates the microprocessor 50, which in turn, sends, via lead 66, a signal corresponding to the measured level to a display driver and unit 68. The operation of the microprocessor 50 itself can be controlled by means of three switches RST, ALT. 0, and LIM connected to the microprocessor via a buffer 70. The function of each of the switches will be described hereinafter. The indicator is further provided with a visual display in the form of a LED 72 which emits light when the measured value conforms to the preset limits of accuracy of measurements. An acoustic signal may be used likewise, or in addition, thereto.

A more detailed explanation regarding the operation of the level indicator of FIG. 4 will now be given with reference to FIG. 5.

The microprocessor 50 (U3 - Motorola 6805E2) is programmed to produce a rectangular pulse about 100 microseconds at its output (pin-14). The pulse is shaped in the pulse conditioner 52 through a differentiation/integration chain (C1-R5, R6-C3) and fed to an amplifier (U4) in order to produce a symmetrical pulse shape with equal positive and negative parts. This shape is important for the electrolytic sensor operation in order to prevent an electroplating process and to extend the sensor's operational life.

The thusly-shaped pulse is fed to the sensor bridge circuit 54. The output of the sensor diagonal is connected to a differential amplifier 56 (U5) which has its output (pin 8) connected to the input of analog switch (U12). which switch, in turn, is connected by its output (pin-13) to a storage capacitor C6. The analog switch (U12) with the storage capacitor C6 form the Sample and Hold circuit 58 which is activated by a sampling pulse provided by the microprocessor 50 (PB7, pin 29). The sampling pulse is 50 microseconds long and it is synchronized with the positive part of the sensor's pulse, however delayed by 20 61 microseconds.

The Sampling and Hold circuit 58 operates in a "fast charge-slow discharge" mode thus allowing sufficient time (when in discharge mode) to compare in the comparator 62, the capacitors potential at (U5, pin-12) to the measuring potential at (U5, pin-13) produced by the D/A convertor 64 (U8). The D/A convertor 64 is connected by its 8 inputs to outputs (Q1 to Q8) of a binary counter (U7 4040). In each measuring cycle, the counter is first reset (pin-11) and then fed by a sequence of pulses (pin-10) from the processor (pin-7) driven by a loop program which counts the number of pulses and monitors the comparator's output. When the D/A converters' output potential is equal to the measured voltage, the comparator 62 switches to its next (Low) output state. This instant is monitored by the microprocessor 50 at its input pin-PA6.

The microprocessor 50 uses the last count as a measured value, and compares it with the table of values stored in its RAM. The table contents is defined by the calibration procedure and allows to receive the output value in chosen measuring units (angle in degrees, inclination in percent, slope) and with a proper 0 offset.

The default values are stored in the microprocessor's read - only memory 48 (U1-2716) and are transferred to RAM during START/RESET operation. The table of values can also be adjusted to an alternate 0 position by special routine.

The resulting values are applied to the display unit 68 (U6, U13) through the display driver (U10, U11).

At the same time, the measured value is compared with the limits specified and preset by the user. If the measured value is within the range between the set low and high limit, the processor will produce an audio and/or visual indication signal. In the present embodiment, a LED (D2) is used to exemplify the indication possibility. The measuring procedure is repeated 10 times per second.

The control of the microprocessor 50 is effected by the three switches RST at pin-1, the ALT. 0 at pin-11 and the LIM at pin-12. When depressed, the RST switch starts the device's operation and restores all values to their default definition.

The actuation of the ALT. 0 switch will result in treating the current sensor position as being "leveled", the output will be adjusted to 0, and all the following measurements will be represented relative to this new zero.

The actuation of the LIM switch will result in changing the limit value from the default value to the desired one.

Optionally, the LIM switch may have three positions. In the first position, it will allow to make ALT. 0 adjustment. In the second position it will allow to set-up the upper limit, and in the third position it will allow to adjust the lower limit. The LCD display unit 68 may indicate the ALT. 0, High Set and Low Set conditions by displaying the ALT, HI, LO messages at the display window. The level indicator is powered from a 9V battery which is connected to the circuit through a latch device. When Start/Reset switch is operated, the latch will be switched on. If the displayed results do not change during a period of e.g., 5 minutes, the processor will assume that the level is not in use and will switch the power off.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electronic level indicator, comprising:
   a housing having at least one planar surface;
   gravity responsive sensor means mounted on said housing, said sensor means constituting at least a part of two branches of an electronic bridge circuit;
   a pulse generator coupled to said bridge circuit for feeding said bridge circuit with short pulses;
   a differential amplifier connected to the output of said bridge circuit;
   an A/D converter connected in circuit for receiving signals from said amplifier and for receiving synchronization signals from said pulse generator, and
   a display unit connected to the output of said converter for displaying numerical data indicative of the inclination of said planar surface.

2. The level indicator as claimed in claim 1 wherein said sensor means is an electrolytic-type sensor.

3. The level indicator as claimed in claim 1 wherein said sensor means is a capacitive pendulum-type sensor.

4. An electronic level indicator, comprising:
   a housing having at least one planar surface;
   gravity responsive sensor means mounted on said housing, said sensor means constituting at least a part of two branches of an electronic bridge circuit;
   a microprocessor coupled to said bridge circuit for feeding said circuit with short pulses;
   a differential amplifier connected to the output of said bridge circuit:
   a sample and hold circuit connected to receive output signals from said differential amplifier and said microprocessor:
   a comparator connected to receive a first signal, at its first input terminal from said sample and hold circuit, a second signal at its second input terminal from said microprocessor via a D/A converter, and to provide an output signal to said microprocessor, and
   a display unit connected to said microprocessor for displaying numerical data indicative of the inclination of said planar surface with respect to a reference level.

5. The indicator as claimed in claim 4 further comprising a pulse conditioner connected in circuit between said microprocessor and said bridge circuit.

6. The indicator as claimed in claim 4 further comprising a visual or acoustic signalling means activated whenever the indicator is positioned within a preset range of accuracy of measurements to be performed.

7. The indicator as claimed in claim 4 further comprising circuit means for selectively indicating on said display unit a numerical value indicative of an inclination relative to any predetermined reference level.

* * * * *